United States Patent

Bishop

[11] Patent Number: 5,549,504
[45] Date of Patent: Aug. 27, 1996

[54] MANUFACTURE OF ROTARY VALVES

[75] Inventor: Arthur E. Bishop, Greenwich, Australia

[73] Assignee: A. E. Bishop & Associates Pty Limited, North Ryde, Australia

[21] Appl. No.: 325,175

[22] PCT Filed: Sep. 30, 1993

[86] PCT No.: PCT/AU93/00504

§ 371 Date: Apr. 20, 1995

§ 102(e) Date: Apr. 20, 1995

[87] PCT Pub. No.: WO94/09943

PCT Pub. Date: May 11, 1994

[30]    Foreign Application Priority Data

Oct. 23, 1992  [AU]  Australia ................... PL5468

[51] Int. Cl.$^6$ .................................................. B24B 1/00
[52] U.S. Cl. .................. 451/28; 451/49; 451/65; 451/72
[58] Field of Search ........................... 451/28, 49, 65, 451/72, 142, 249

[56]            References Cited

U.S. PATENT DOCUMENTS

| | | | |
|---|---|---|---|
| 4,122,635 | 10/1978 | Asano et al. ................. | 451/72 |
| 4,452,274 | 6/1984 | Haga et al. ................. | 137/625.22 |
| 4,460,016 | 7/1984 | Haga et al. ................. | 137/625.24 |
| 4,540,024 | 9/1985 | Bacardit ..................... | 137/625.21 |
| 4,924,910 | 5/1990 | Tabata et al. ............... | 137/625.23 |
| 5,267,588 | 12/1993 | Bishop et al. ............... | 137/625.23 |
| 5,299,388 | 4/1994 | Bishop ....................... | 451/49 |
| 5,439,412 | 8/1995 | Bishop ....................... | 451/49 |

Primary Examiner—Bruce M. Kisliuk
Assistant Examiner—Derris Banks
Attorney, Agent, or Firm—Nikaido, Marmelstein, Murray & Oram LLP

[57]              ABSTRACT

A machine for grinding longitudinal troughs in the edges of grooves of a power steering valve input-shaft (4), the input-shaft being supported for rotation on supports (14, 15), a grinding wheel (30) having a contoured periphery corresponding in cross-section to the cross-section of the trough (5), the grinding wheel being relatively movable towards the input-shaft to some predetermined depth of engagement therewith and to be retracted therefrom and being movable axially relative to the input-shaft to form a longitudinal trough (5) to produce oblique terminations of the trough.

12 Claims, 9 Drawing Sheets

MANUFACTURE OF ROTARY VALVES

BACKGROUND OF THE INVENTION

1. Field of the Invention

This invention relates to the manufacture of rotary valves such as are used in hydraulic power steering gears for vehicles and in particular valves as disclosed in International Patent Application PCT/AU93/00015. That application describes a low noise rotary valve having a unique linear boost characteristic.

2. Description of the Related Art

In general, such rotary valves include an input-shaft which incorporates in its outer periphery a plurality of blind-ended, axially extending grooves separated by lands. Journalled on the input-shaft is a sleeve having in its bore an array of axially extending blind-ended slots matching the grooves in the input-shaft, but in underlap relationship thereto, the slots of one being wider than the lands of the other so defining a set of axially extending orifices which open and close when relative rotation occurs between the input-shaft and the sleeve from a centred position, the magnitude of such rotation henceforth referred to as the valve operating angle. The edges of the input-shaft grooves are contoured so as to provide a specific orifice configuration and are referred to as the metering edge contours. These orifices are ported as a network such that they form sets of hydraulic Wheatstone bridges which act in parallel to communicate oil between the grooves in the input-shaft and the slots in the sleeve, and hence between an engine driven oil pump, and right-hand and left-hand hydraulic assist cylinder chambers incorporated in the steering gear. The input-shaft and sleeve are biased towards the centred position by a torsion bar spring as is well known in the art. The relationship between the level of power assistance generated in the valve, as a function of input torque, is known as the boost characteristic, and is largely determined by the metering edge contours.

It is convenient to refer to the metering edge contours as controlling three zones of the boost characteristic, the high pressure contour associated with the parking zone, an intermediate contour associated with the cornering zone, and a central zone associated with straight ahead driving where normally minimum boost is desired. For many vehicles it is becoming increasingly accepted that in the critical cornering zone, a truly linear relationship should exist between input torque applied by the driver and the level of power assistance, that is, a linear boost characteristic.

At the same time, increasing emphasis is placed on achieving a very low noise level, particularly when the valve is operating at high pressures such as in parking. Typically this is achieved by having each high pressure contour associated with the parking zone comprise a shallow chamfer which, in section, is inclined at a slope between about 4° and 8° at the junction between the chamfer and the periphery of the input-shaft. By this means, the overall flow at high pressures is divided equally into a series of thin sheets or jets between the several orifices which are closing simultaneously. Such thin sheet jets have been shown to be less likely to produce cavitation and associated valve hiss. At larger chamfer angles than about 8°, flow separation between the oil flow and adjacent periphery of the input-shaft may occur, also leading to cavitation. The shallow chamfer typically subtends an angle of about one degree at the input-shaft axis and thereafter extends towards the input-shaft groove edge as an intermediate contour in the form of a steeper chamfer or, preferably, in the form of a curved chamfer or scroll of decreasing radius. Such a latter scroll concept is earlier taught in EPO Patent 0196172 and provides a means of achieving a linear boost relationship in the cornering zone for a low noise valve.

The particular feature of International Application PCT/AU93/00015 is the addition of a longitudinal trough lying within some or all of the cornering zone chamfers, this trough serving to extend the linear boost region which otherwise ceases to be linear about halfway through the desired pressure range due to the changing orifice characteristic resulting from the increasing viscous drag of the oil as the jet thickness decreases towards the parking zone chamfer.

In a typical example the trough has a bottom surface substantially parallel and concentric with the outside diameter of the input-shaft and terminates circumferentially in an abrupt axially extending escarpment leading to the parking zone chamfer on the one side, and on the other side opens to the cornering zone chamfer or side of the longitudinal groove.

The trough may be substantially axially shorter than the parking zone chamfer and adjacent cornering zone chamfer; also the trough may be incorporated in all or only in some of the metering edge contours. These factors allow relatively deep troughs to be used and hence the input-shafts to be manufactured using the roll imprinting process. However the use of such axially shorter troughs means that it is not possible to achieve a precisely uniform distribution of oil along the full length of all chamfers when the valve is operating in the parking zone, as oil reaches the start of each of these chamfers at a substantially higher pressure for axial positions where the trough is present than for other axial positions where no trough is present. This may cause increased levels of cavitation. Nevertheless for designs of valves where a low oil flow is used, this method still provides an efficient means of achieving acceptably low noise levels. For other designs requiring a relatively high oil flow and/or very low noise levels, it is preferred that the troughs extend along all metering edge contours most of their length, in which case they may be required to be as shallow as 20 um to 30 um. Because the roll imprinting process is carried out prior to input-shaft hardening and finish grinding of the outside diameter, such roll imprinted troughs are inevitably subject to random depth variations due to component distortion which could be tolerated if the troughs were relatively deep, but cannot be tolerated if they are only 20 um to 30 um deep.

In such cases it is preferred that the troughs be produced, not by roll imprinting, but by grinding after the input-shaft is hardened and finish ground on the outside diameter. It is further preferred that this trough grinding process occurs after grinding of the remaining chamfer or chamfers of the metering edge contour, however both grinding processes can be carried out in a single operation without removing the input-shaft from the machine. This can achieve the very high precision needed in angularly positioning the troughs relative to the chamfers, whereas to re-establish this angular relationship accurately if a separate later operation were used would be very difficult due to the shallow angle of these chamfers.

However, because of the re-entrant angle formed by the bottom surface and the escarpment of the trough, such troughs cannot be ground by conventional chamfer grinding machines, such as disclosed in International Patent Application PCT/AU91/00494, where the axis of the grinding wheel is maintained substantially parallel to the axis of the input-shaft. A machine and process capable of grinding such a trough is described in the present specification, as is a trough having particularly desirable characteristics.

SUMMARY OF THE INVENTION

The present invention consists in a machine for grinding longitudinal troughs in the edges of grooves of a power steering valve input-shaft including means to support the input-shaft for rotation about its axis, a grinding spindle having an axis substantially at right angles to the input-shaft axis and laterally displaced therefrom, a grinding wheel mounted on the grinding spindle having a contoured periphery corresponding in cross-section to the cross-section of the trough, means to rotate the spindle, first means to move the grinding wheel relatively towards the input-shaft to some predetermined depth of engagement therewith and to retract the grinding wheel on completion of grinding and a second means to move the grinding wheel axially relative to the input-shaft to form a longitudinal trough therein and means to rotate the input-shaft upon the retraction of the grinding wheel, the grinding wheel being of suck a diameter as to produce oblique terminations of the trough.

It is preferred that the grinding wheel periphery comprises two contours which are mirror images of each other relative to a line passing through the axis of the input-shaft. This ensures that, even if the angular spacing or width of the grooves around the periphery of the input-shaft is non-uniform., a symmetrical distribution of right-hand and left-hand troughs will be generated on all relevant input-shaft grooves or lands, resulting in the boost characteristic of the steering gear in left-hand and right-hand turn manoeuvres also being symmetrical.

It is preferred that a machine according to the invention shall include a cylindrical dressing wheel for dressing said grinding wheel, supporting means for said dressing wheel including means for rotating, raising and lowering the axis of the dressing wheel, relative to the axis of the grinding wheel, the supporting means being mounted in a position in relation to the grinding wheel such that the grinding wheel is relatively moveable, for example by said first means, to bring the surface of the grinding wheel into contact with the dressing wheel for dressing.

The present invention further consists in a method of manufacturing a metering edge contour on the grooves of a power steering valve input-shaft comprising the following steps:

a) milling, hobbing or grinding a plurality of blind-ended, axially extending grooves separated by lands in the outer periphery of an input-shaft of a rotary valve, b) grinding a chamfer on the edge of at least one groove by means of a grinding wheel arranged with its axis substantially parallel to the axis of the input-shaft to produce a surface finish on the chamfer, the lay of which is in the direction of oil flow across the chamfer, and c) grinding a trough in at least one chamfer with a grinding wheel the axis of which is substantially perpendicular to the axis of the input-shaft to produce a surface finish in the trough the lay, of which is substantially perpendicular to the direction of oil flow across the trough.

The order of steps b) and c) may be reversed so that the troughs are ground first alongside the respective grooves, and the chamfers produced after.

A product of the present invention consists in a rotary valve for a hydraulic power steering gear comprising an input-shaft having in its outer periphery a plurality of axially extending grooves separated by lands, a sleeve journalled on said input-shaft, said sleeve having in its bore an array of axially extending slots matching the grooves in the input-shaft but in underlap relationship thereto, the slots of said sleeve being wider than the lands of said input-shaft so defining a set of axially extending orifices controlling fluid flow within said valve which open and close when relative rotation occurs between the input-shaft and the sleeve from a centred position, a torsion bar spring urging said input-shaft and said sleeve towards a centred position, the edges of at least one said input-shaft groove incorporating one or more metering edge contours, at least one said metering edge contour including a shallow chamfer aligned parallel to the axis of said input-shaft and extending obliquely inwardly from said input-shaft outside diameter characterised in that at least one said metering edge contour incorporates an axially extending trough in said chamfer, the trough having a bottom surface substantially parallel and concentric to said outside diameter, said trough terminating circumferentially in one direction in an axially extending escarpment bounding said chamfer and leading circumferentially in the opposite direction to said groove or said chamfer the trough terminating longitudinally at each end in an oblique termination The term "oblique termination" as used in the present specification means a longitudinal termination of a trough in the edge of a groove in an input-shaft constituted by the convergence of first and second intersecting lines, the first intersecting line being generated by the intersection of the escarpment of the trough with a chamfer or the outside diameter of the input-shaft and the second intersecting line being generated by the intersection of a bottom surface of the trough with the chamfer or the outside diameter of the input-shaft or the edge of a groove thereby effecting a gradual reduction in the circumferential width and radial depth of the trough in the region of the termination.

Known axially shorter trough geometries will inherently produce a non-uniform distribution of oil flow across the length of the chamfer. However, in the case of the present invention, the oblique termination of the trough causes a less sudden change in the flow velocity of the oil. This reduces viscosity-induced shear forces in the oil and hence reduces cavitation compared to the situation where such a termination is sharp. It can be shown that a grinding wheel of about 30 mm to 40 mm diameter will provide an oblique axial termination (or "run-out") of about 5° to 8° relative to the outside periphery of the input-shaft, an angle similar to that occurring circumferentially between the previously (or subsequently) produced chamfer and the outside diameter of the input-shaft and, as described earlier, used to prevent flow separation.

The trough so ground by the present invention will have, on average, a greater depth than that of the chamfer, but be of substantially constant depth or increase in depth towards the escarpment portion of the trough, whereas the chamfer becomes progressively shallower. The flow of oil thus takes the form of a thin sheet over the full length of the metering edge contour including the chamfer, the trough and its oblique termination. Now it is known that in such orifices which are wide but of relatively shallow depth, the flow of oil tends to be laminar, and that the resistance to flow is greatly influenced by the roughness of the surfaces which bound the orifices. The effect of such roughness is far greater when the direction of the surface finish irregularities, as those for example produced by a grinding wheel, lie at right angles to the direction of flow than when they lie in the same direction.

Because chamfers are inevitably extremely shallow in depth, it is highly desirable that their surface finish irregularities lie in the same direction as oil flow, as in the case of chamfers produced by the chamfer grinding machine disclosed in International Patent Application PCT/AU91/00494. This issue relating to the direction of surface finish irregularities represents one of the major disadvantages of the chamfer and groove grinding machine disclosed in German Patent 4101671 wherein the surface finish irregularities of the chamfer are directed perpendicular to the direction of oil flow.

Troughs, on the other hand, are (by definition) deeper than the chamfers in which they lie. Because of their greater depth, the hydraulic characteristic of the trough can be satisfactorily controlled even though the surface finish irregularities are disposed perpendicular to the direction of oil flow, as in the case of the present invention, provided that the level of surface roughness of the trough is controlled within close limits.

It follows from the above that a critical aspect of the trough grinding machine, which is the subject of the present invention, is the achieving of a precise profile of the grinding wheel, a smooth surface finish, and precise positioning of the trough, both in depth and angular position, about the axis of the shaft with respect to the previously (or subsequently) produced chamfer.

It may be argued that the surface roughness of the trough, if always constant, could be compensated for by adjusting the depth of the trough. However it is only by making the surface very smooth initially that the effect of variation of roughness, which inevitably occurs between dressings of the wheel, can be avoided. It would be impractical to allow for the effects of such varying roughness by in-process gauging such as described in International Patent Application PCT/AU91/00496, the use of which is still preferred in association with the grinding machine of the present invention.

Most of the features of the method and apparatus described in International Patent Application PCT/AU91/00494 can be incorporated in the grinding machine of the present invention. Indeed the two machines can be combined as a single machine carrying out a two stage grinding operation. It is this arrangement which will be described as an embodiment of the present invention.

It is preferred that the grinding wheel periphery comprises two contours which are mirror images of each other and disposed about a line passing through the axis of the input-shaft. This will result in a symmetrical distribution of right-hand and left-hand metering edge troughs on the relevant input-shaft grooves and hence an equivalent boost characteristic for the steering gear in left-hand and right-hand turn manoeuvres.

However, in order to achieve the desired high surface finish and form accuracy for the trough, an even more specific geometry for the cross section of this trough is preferred. This specific geometry, which is generated on the periphery of the trough grinding wheel, comprises two mirror-imaged ribs each comprising in section two intersecting concave arcs of the same radius. The inner arcs may have a common centre coincident with that of the input-shaft to be ground, or maybe slightly separated. These arcuate portions on the periphery of the trough grinding wheel therefore comprise parts of three toroids (or four if the latter arc centres are separated), all of identical geometry, a feature which makes possible the generation of these surfaces by the use of a cylindrical dressing wheel (preferably diamond plated) whose axis of rotation is arranged at right angles to that of the grinding wheel during dressing. On the other hand the arcuate portions of the grinding wheel contour may be replaced by intersecting straight lines or other forms, symmetrically disposed as earlier described. Because of the narrowness of the parts of the toroid used, they can be approximated by such straight lines or other forms.

The grinding wheel is preferably of Cubic Boron Nitride (C.B.N.) type which is difficult to dress using a single point diamond (as is normally used to dress forms on ceramic wheels). By using the dressing wheel described above, the form accuracy and symmetry of the C.B.N. wheel is not degraded as some wear occurs on the diamond dressing wheel. It is also possible to attach the C.B.N. material onto a precise form-contoured metal blank via electroplating. The dressing means described above can then be applied as a subsequent "truing" operation on the grinding wheel.

The means of orientating the input-shaft prior to grinding the chamfers with respect to the previously machined features, as described in International Patent Application PCT/AU91/00496 is also applicable to the present invention. This gauging technique can also be used to gauge the depth of the troughs made according to this invention and also determine their relationship to the previously (or subsequently) ground chamfers, where present.

BRIEF DESCRIPTION OF THE DRAWINGS

The present invention will now be described by way of example with reference to the accompanying drawings in which.

DETAILED DESCRIPTION OF THE PREFERRED EMBODIMENTS

International Patent Application PCT/AU93/00015 shows details of the orifice formed between the input-shaft metering edge contour and the adjacent sleeve edge, a construction aimed at providing an extended linear boost characteristic, a quick transition into the parking zone, and a low noise characteristic. According to one embodiment of the invention disclosed in that specification, the length of the trough is preferably about one half or less than the entire metering edge contour length. Such a trough can be produced by the roll imprinting method referred to.

However, as mentioned earlier, some power steering valves require a lower noise level than can be achieved using this construction and it is necessary to make the trough shallower and of a length which may be more than half of the overall length of the metering edge contour, even approaching the full length thereof. The flow of oil is thereby more evenly distributed over the length of the chamfers which serves to suppress noises originating in cavitation. The troughs must therefore be made substantially shallower and the point at which the escarpment 46 (FIG. 4 of that application) meets flat chamfer 39, as at point 47, must be precisely the same on all contours. Cavitation occurring on only one such contour is sufficient to produce unacceptable valve noise. The required tolerances are smaller than those obtainable by the roll imprinting process referred to in this co-pending application and hence the grinding method of the present invention is appropriate.

Figure 1:
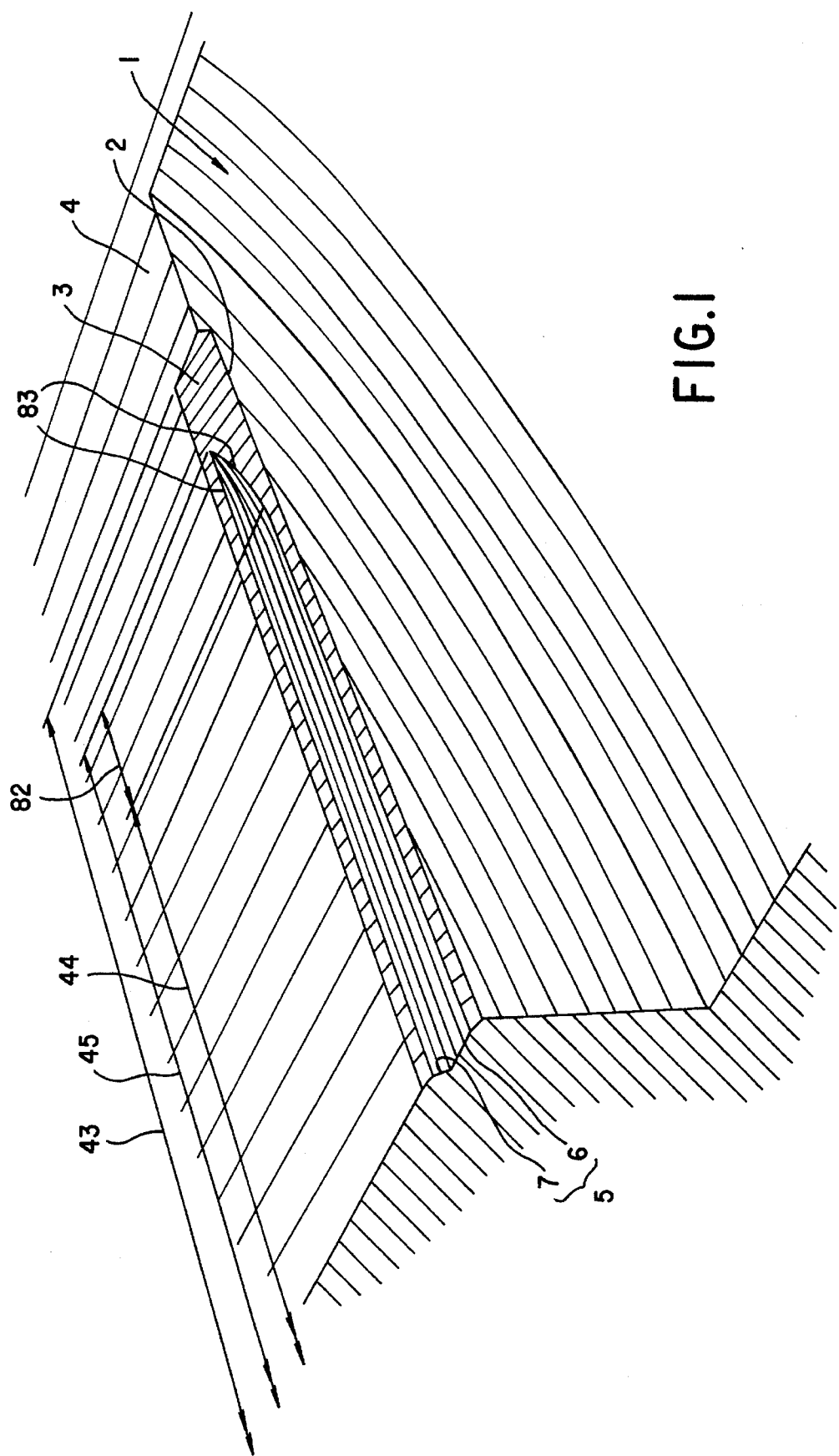
FIG. 1 is an isometric view of a metering edge contour incorporating a trough ground by a machine in accordance with the present invention.
Figure 2:
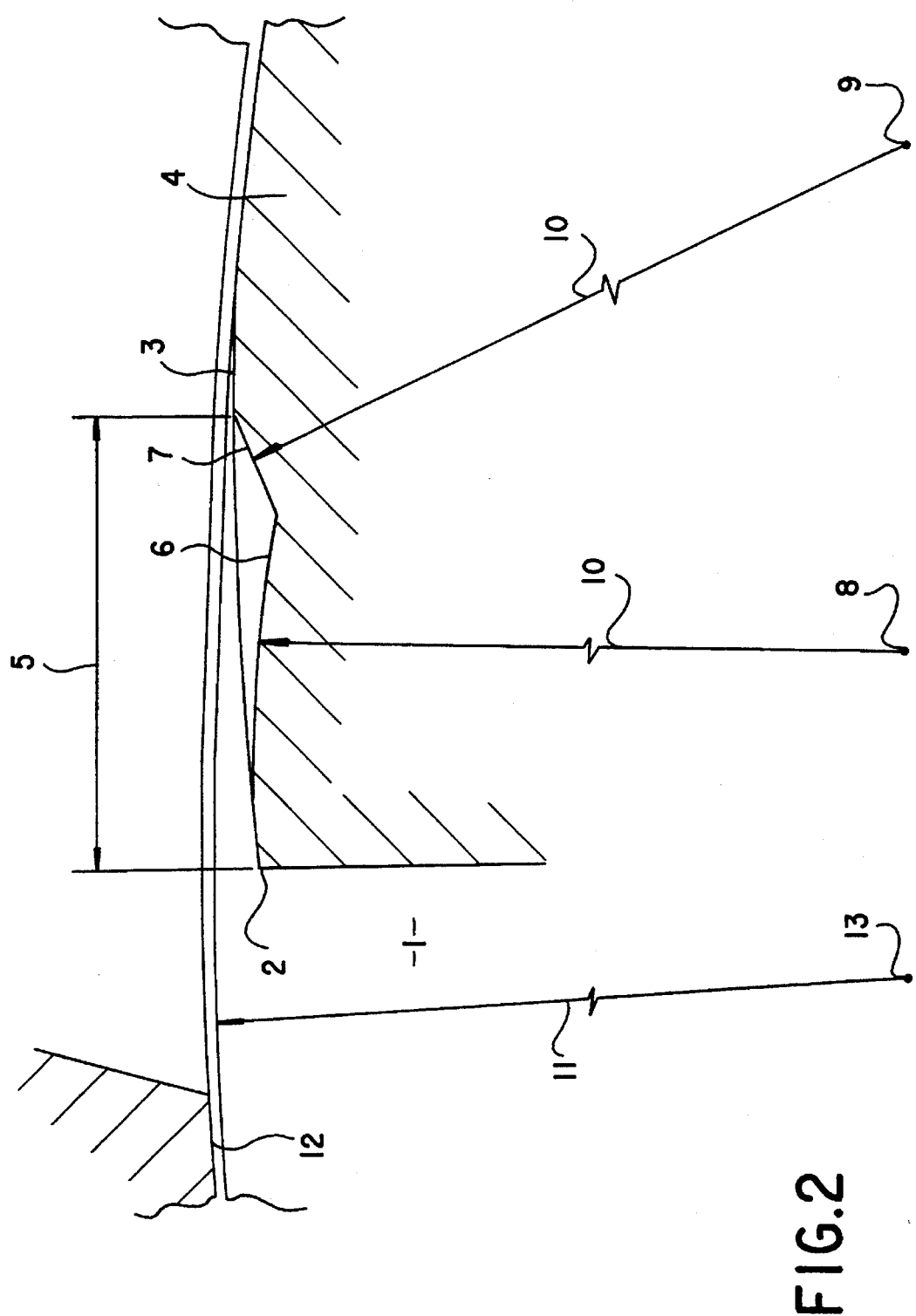
FIG. 2 is a cross sectional view through the metering edge contour, on a plane perpendicular to the input-shaft axis.

FIGS. 1 and 2 show the general appearance of the input-shaft metering edge contour made by the machine and process which is the subject of this specification. Here input-shaft groove 1 has been produced by milling, hobbing or grinding and may or may not have been modified by roll imprinting in order to improve the accuracy of spacing of the groove edge 2.

Figure 4:
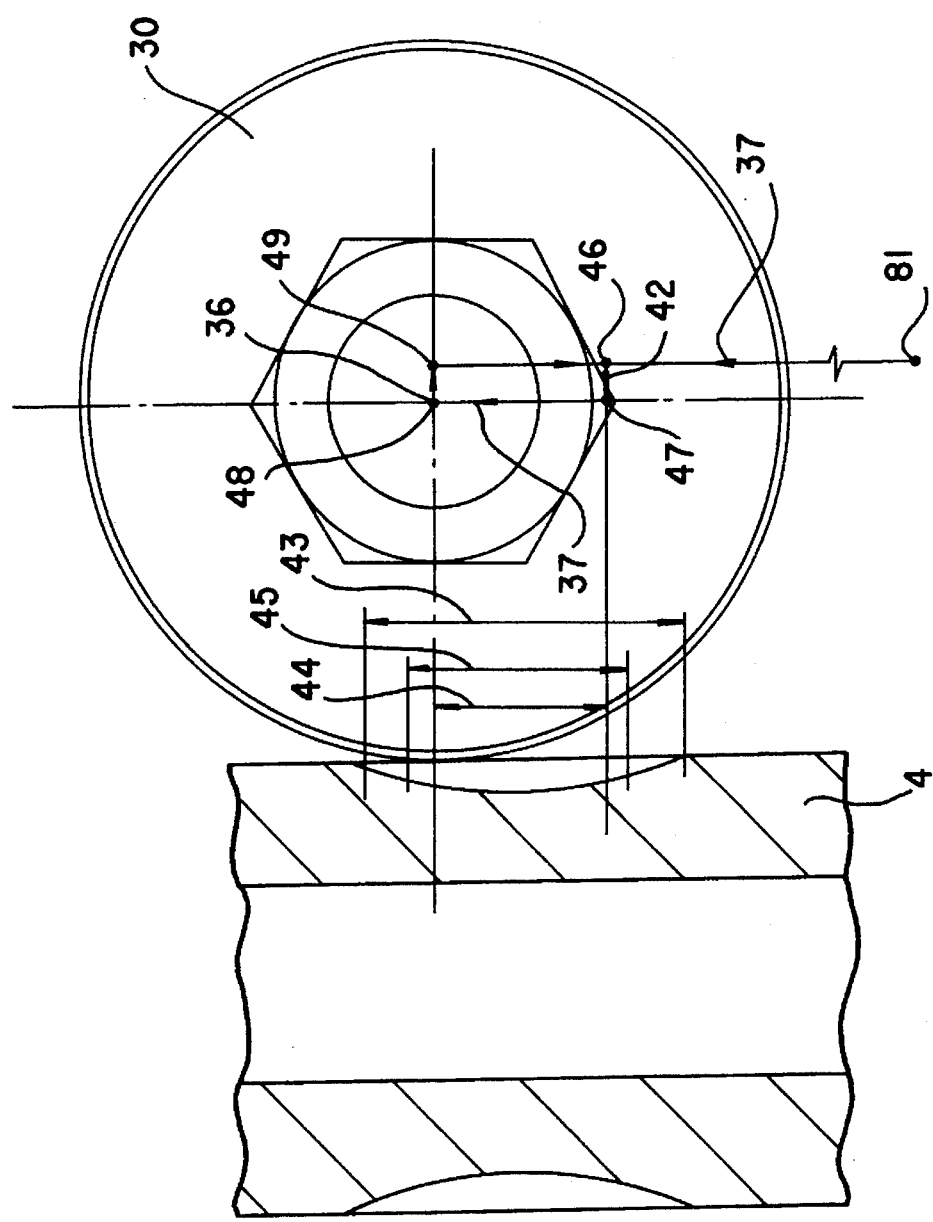
FIG. 4 is an enlarged part sectional view of the input-shaft and trough grinding wheel, in a direction parallel to the trough grinding wheel axis.

Chamfer 3 is substantially the same as chamfer 39 of FIG. 4 of International Patent Application PCT/AU93/00015 and preferably extends towards groove edge 2 in the form of a parabolic scroll. Trough 5 comprises bottom surface 6 and escarpment 7. FIG. 1 has been rendered to show the direction of the surface finish lay for different parts of the metering edge contour. As can be seen, the surface finish lay in the case of chamfer 3 is circumferentially orientated, that is in the same direction of oil flow across the chamfer. The surface finish lay of trough 5 is axially orientated, that is perpendicular to the direction of oil flow across the trough.

A particular feature of this construction relates to the blending longitudinally of trough 5 into chamfer 3. As is best seen in FIG. 1 the oblique termination of trough 5 is achieved by the convergence of two intersecting lines, namely upper line 83 and lower line 83, upper line 83 being generated by the intersection of escarpment 7 with chamfer 3 and lower line 83 being generated by the intersection of bottom surface 6 with chamfer 3. Such an oblique termination of trough 5, as described earlier, reduces shear forces in the oil that would normally occur in the case of a sharp termination of the trough, thus reducing the possibility of forming vortices as the oil discharges into the adjoining valve chambers. This is particularly the case for those metering edge contours which are subject to outward flow from the input-shaft groove into the adjacent sleeve grooves. By way of example, a satisfactory oblique termination of trough 5 having a depth of about 30 um can be achieved using a grinding wheel diameter of 30 or 40 mm. Escarpment 7 is more shallowly inclined to the cylindrical surface of the input-shaft than in the case of that shown in FIG. 4 of International Patent Application PCT/AU93/00015 due to the shallower depth of trough 5. In a preferred form of the invention, for reasons relating to the ease of production and improved symmetry of the metering edge contours on opposing edges of the grooves, bottom surface 6 and escarpment 7 comprise arcs of equal radius 10 about centres 8 and 9. This radius is not necessarily the same as radius 11 of cylindrical periphery 12 of the input-shaft whose central axis is shown at centre 13. The resulting convexity of surface 7 is of no functional disadvantage which could as well be flat except for the aforesaid convenience in manufacturing as will be described.

Figure 8:
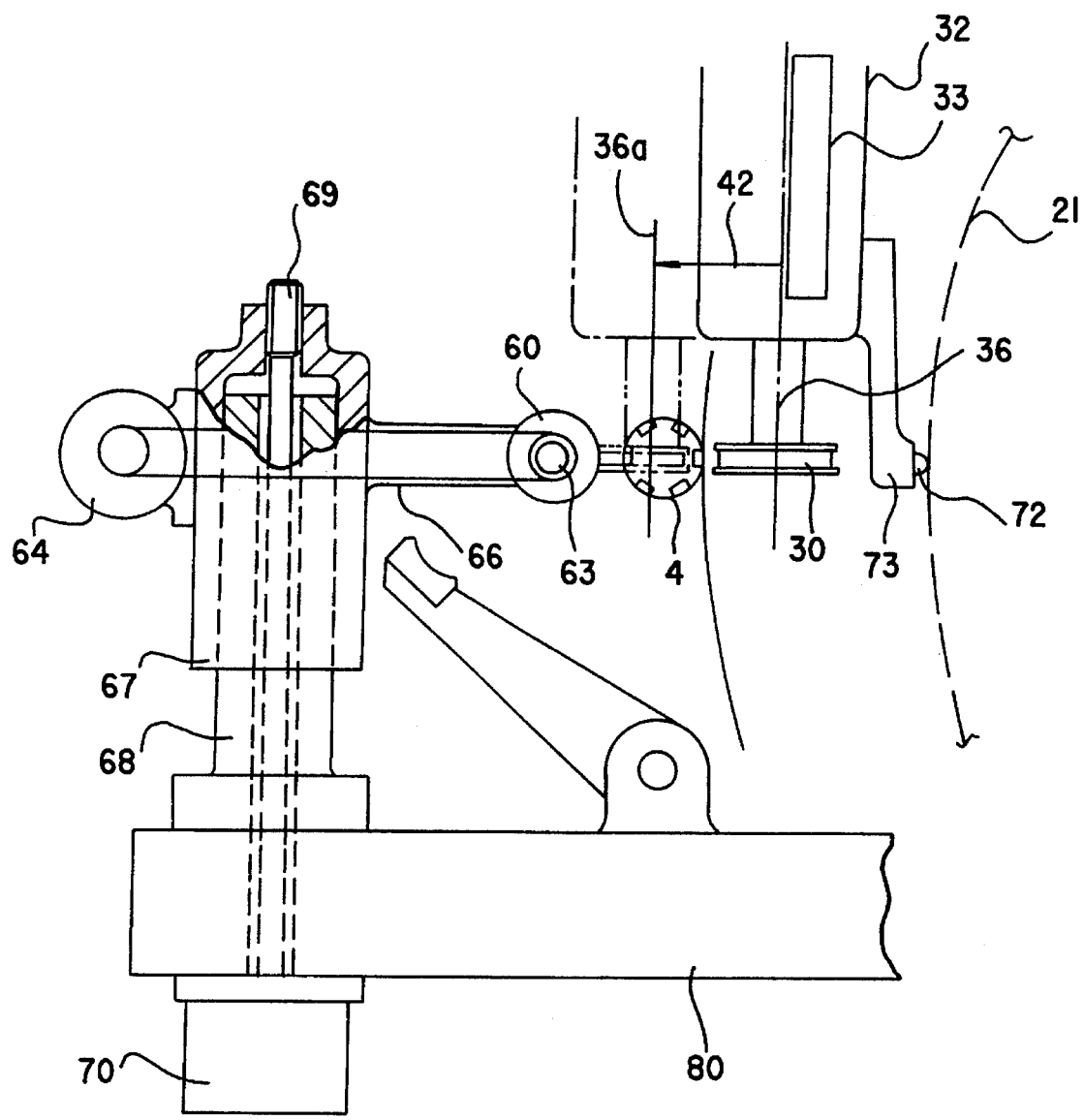
FIG. 8 shows details of a dressing fixture incorporated into an integrated feather/trough grinding machine.

Centres 8 and 13 maybe coincident in which case bottom surface 6 of trough 5 is of uniform radial depth with respect to bore 12 of the mating sleeve, which is illustrated here for reference. Alternatively centre 8 may be displaced to the left of centre 13 so that trough 5 increases in depth towards escarpment 7 as shown in FIG. 8 of international patent application PCT/AU93/00015.

Figure 3:
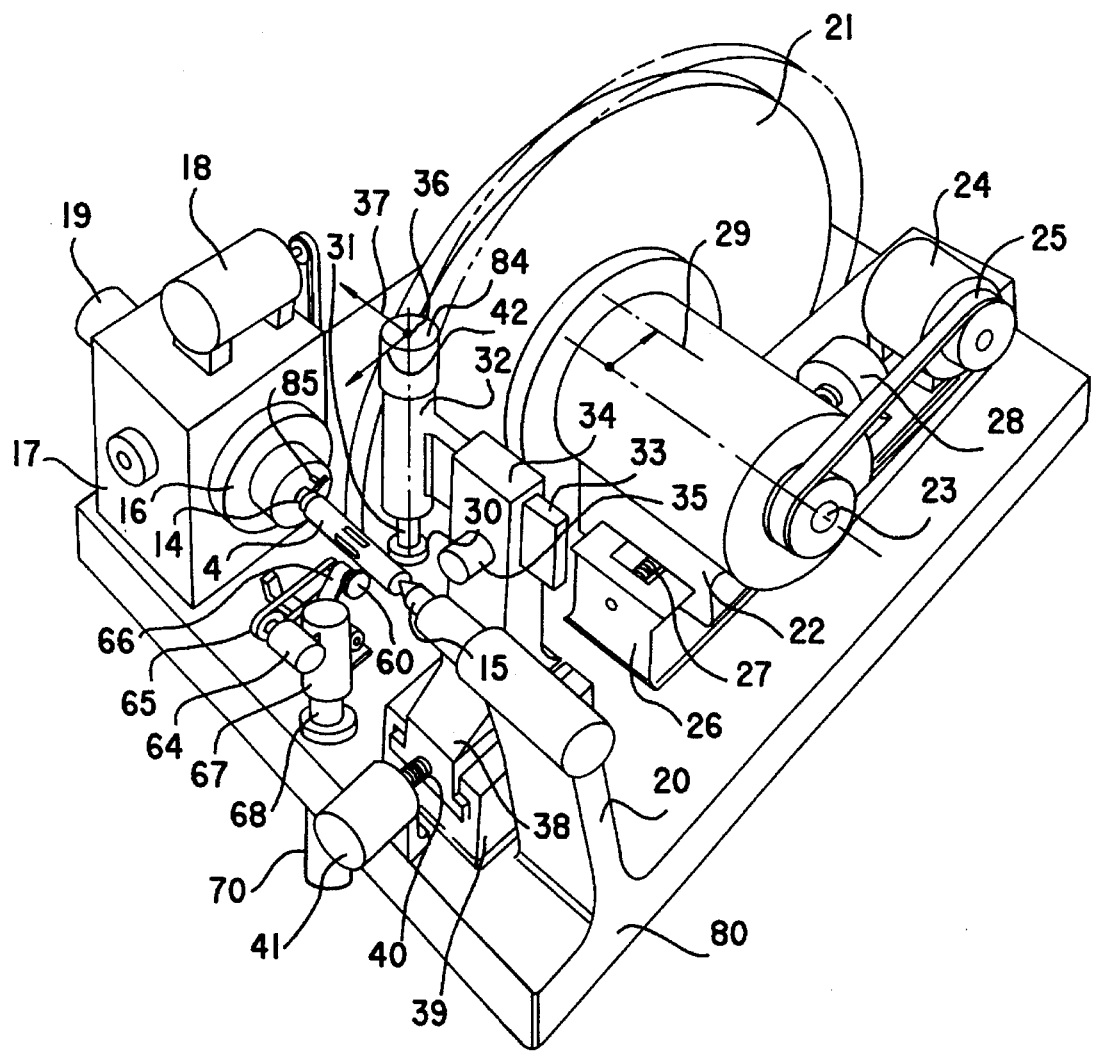
FIG. 3 is an isometric view of a trough grinding machine in accordance with the present invention, in this case integrated with a chamfer grinding machine.

FIG. 3 shows the general arrangement of a grinding machine made according to the invention. Here input-shaft 4 is supported between centres 14 and 15 and caused to rotate via the engagement of driving carrier 85 with drive plate 16, in the conventional manner according to normal cylindrical grinding machine practice.

Headstock 17 is mounted on machine base 80 and is equipped with servo controlled drive motor 18 which drives drive plate 16 through appropriate belt and gearing. Angular encoder 19 monitors rotation of drive plate 16. Tailstock centre 15 is supported in the conventional manner by tailstock 20.

Chamfer grinding wheel 21 is supported on wheelhead slide 22 which houses appropriate spindle bearings having axis 23 and is driven by motor 24 via belt 25, all in the conventional manner.

Wheelhead slideway 26 is supported on base 80 and is equipped with leadscrew 27 driven by servomotor 28 which serves to quickly traverse axis 23 of chamfer grinding wheel 21 to and from working position 23 (as shown) to the clearance position 29, and to infeed chamfer grinding wheel 21 as required for grinding input-shaft 4 or for a dressing operation on chamfer grinding wheel 21 as will be described.

The operation of grinding chamfers 3 of the metering edge contours (12 chamfers in all for the 6 groove input-shaft illustrated) is performed by commencing the rotation of input-shaft 4 and simultaneously bringing chamfer grinding wheel 21 into engagement with an edge of the first groove. Drive motor 18 may be controlled to rotate input-shaft 4 at a variable rate of rotation as described in International Patent Application PCT/AU91/00494. As the input-shaft rotates, servo motor 28 drives leadscrew 27 in such a manner as to feed chamfer grinding wheel 21 in and out so as to grind the finished metering edge contours on the 12 edges of the grooves of input-shaft 4. Wheelhead slide 22 is then retracted to bring axis 23 of chamfer grinding wheel 21 to clearance position 29 and rotation of input-shaft 4 is then stopped in a position suited to the grinding of trough 5 of one groove.

Trough grinding wheel 30 is mounted on spindle 31 and is journalled to rotate in trough grinding spindle housing 32 about axis 36 driven by high speed motor 84. Housing 32 is mounted on slide 33 which is traversed laterally in slideway 34 by servo motor 35 having conventional gearing and leadscrew not shown.

In the position shown in FIG. 3, trough grinding wheel 30 is in the parked position 81 and can be rapidly fed axially of the axis of the input-shaft via servomotor 35 to retracted position 46 in direction 37 (see FIG. 4). Slideway 34 incorporates, at its lower end, slide 38 which can be traversed within slideway 39 by leadscrew 40 driven by servo motor 41. This is used to infeed trough grinding wheel 30 wherein its axis 36 moves in direction 42 from retracted position 46 to start-grinding position 47. At position 47 it has penetrated the previously ground chamfer 3 of the metering edge contour to the full depth required to form trough 5.

It is preferred that trough grinding wheel 30 has two ribs on its periphery (see FIG. 5), so placed that the opposing edges of groove 1 can be ground at the same time. Because these ribs have contours which are mirror images, one of the other, the opposing metering edge contours of groove 1 must be precisely of the same form.

Servo motor 35 is now re-activated to slowly feed trough grinding wheel 30 in direction 37 until it reaches end-grinding position 48, hence fully forming trough 5. Servo motor 41 is now re-activated in the reverse direction to retract trough grinding wheel 30 from end-grinding position 48 to position 49 whereupon it is rapidly fed back to retracted position 46. Headstock drive motor 18 is now energised to rotate the drive plate 16 through 60° as measured by angular encoder 19, so as to bring the next groove of input-shaft 4 into position for grinding the next pair of troughs. The cycle is now repeated to again move trough grinding wheel 30 to successive positions 47, 48, 49 and 46 as shown as a rectangle in FIG. 4.

When the grinding of all six slots has been completed servo motor 35 is re-activated to move spindle axis 36 of trough grinding wheel 30 back from retracted position 46 to the parked position 81 (FIG. 4), being the position illustrated in FIG. 3. The width of the chamfer grind produced by chamfer grinding wheel 21 is illustrated as length 43 and the distance of traverse of trough grinding wheel 30 is indicated as length 44, these lengths typically being 15 mm and 10 mm respectively. Due to the typical 30 um depth of engagement of trough grinding wheel 30, the additional length 82 to the run-out of the trough grinding cut in chamfer 3 will be approximately 1 mm in each direction, so that the overall length 45 of trough 5 is 12 mm as illustrated in FIGS. 1 and 4. This run-out, which occurs over length 82, causes an oblique termination 83 of trough 5 in this region, with the advantages of noise suppression previously described.

The means of achieving mirror image contours on the opposing ribs of trough grinding wheel 30 will now be described with reference to FIGS. 5 and 6.

Now it is known that C.B.N. grinding wheels are singularly suited to the grinding of hardened steel and are capable of removing large amounts of material between re-dressings. This is particularly important where a small diameter grinding wheel must be used which would require frequent dressings if conventional grinding materials were used.

Because C.B.N. has a hardness approaching that of diamond, C.B.N. grinding wheels can only be dressed to a precise form using a diamond dressing tool. If the dressing were accomplished by traversing a single point diamond across the wheel in a path corresponding to that of the form required (a technique used in the dressing of conventional grinding wheels), then the diamond point would quickly wear and the form would rapidly lose accuracy. To overcome this problem when, for example, dressing cylindrical wheels, a dressing tool coated with a cluster of diamonds is used so as to distribute the dressing task between hundreds of individual stones. Furthermore, it is essential that such a cluster dressing tool be traversed across the surface of the C.B.N. wheel in a direction other than the direction that this surface is traversed during actual grinding. This is to avoid the possibility that surface irregularity of the cluster dressing tool would be transferred to the C.B.N. surface. Only certain surfaces are capable of being dressed in this manner, for example cylinders, cones or toroids. Now bottom surface 6 of trough 5 is desirably of toroidal shape as was earlier described, and because it is desired that all four faces of the two ribs of trough grinding wheel 30 be dressed at the same time, it follows that the area of the wheel which grinds escarpment 7 of the trough should also be of toroidal shape. According to one preferred form of the invention, the cluster dressing tool takes the form of a very short cylinder whose periphery is plated with diamonds and which is arranged to be rotated on a spindle at right angles to that of the C.B.N. grinding wheel in four successive positions so as to dress all four faces of the two ribs.

Figure 5:
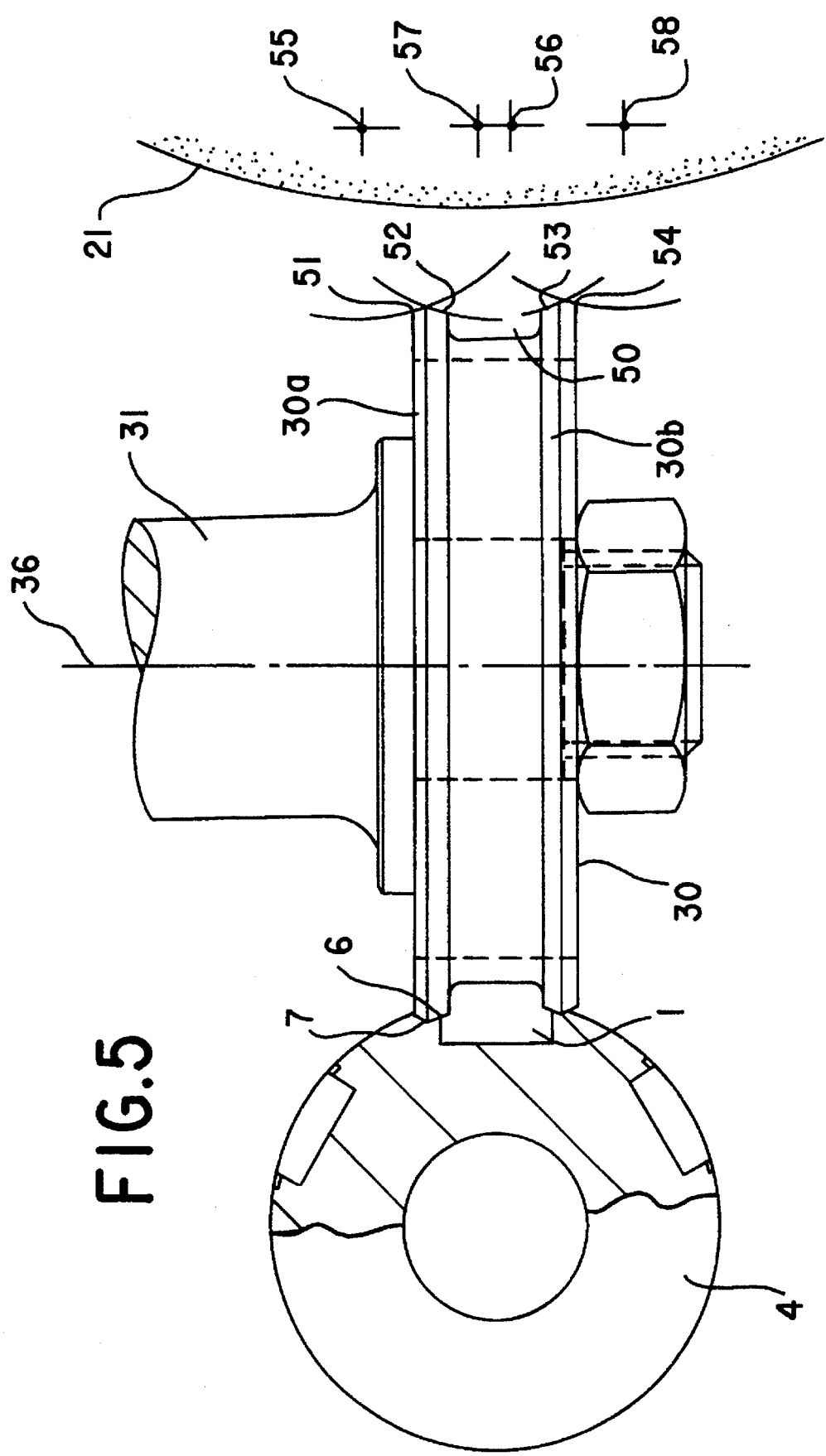
FIG. 5 is a normal sectional view of an input-shaft in contact with the trough grinding wheel. Details of the geometry for dressing the grinding wheel are also shown.

Referring to the right-hand side of FIG. 5, trough grinding wheel 30 has bonded C.B.N. material on its periphery, this material formed in the shape of two ribs 30a and 30b separated by recess 50. The external surfaces of the ribs comprise in section four arcs 51, 52, 53 and 54 having centres 55, 56, 57 and 58 respectively. They are therefore segments of toroids whose axes lie on centreline 36 and whose arc profiles have centres 56, 57, 58 and 59. According to the preferred form of the invention, all four arcs are of equal radius, a radius slightly smaller than the radius of the outside periphery of input-shaft 4.

Figure 6:
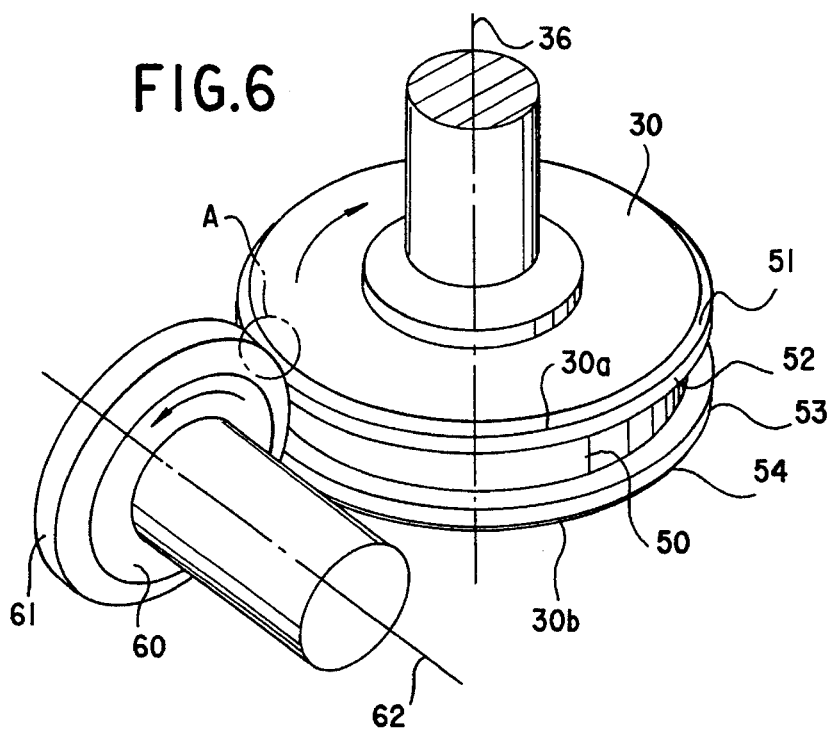
FIG. 6 is an isometric view of the dressing wheel in contact with the grinding wheel.

Diamond plated dressing wheel 60, which is shown in FIG. 6 engaged with trough grinding wheel 30 during a dressing operation, rotates about axis 62 as trough grinding wheel 30 rotates about its axis 36. Its outer periphery 61 is plated with diamonds.

Figure 7:
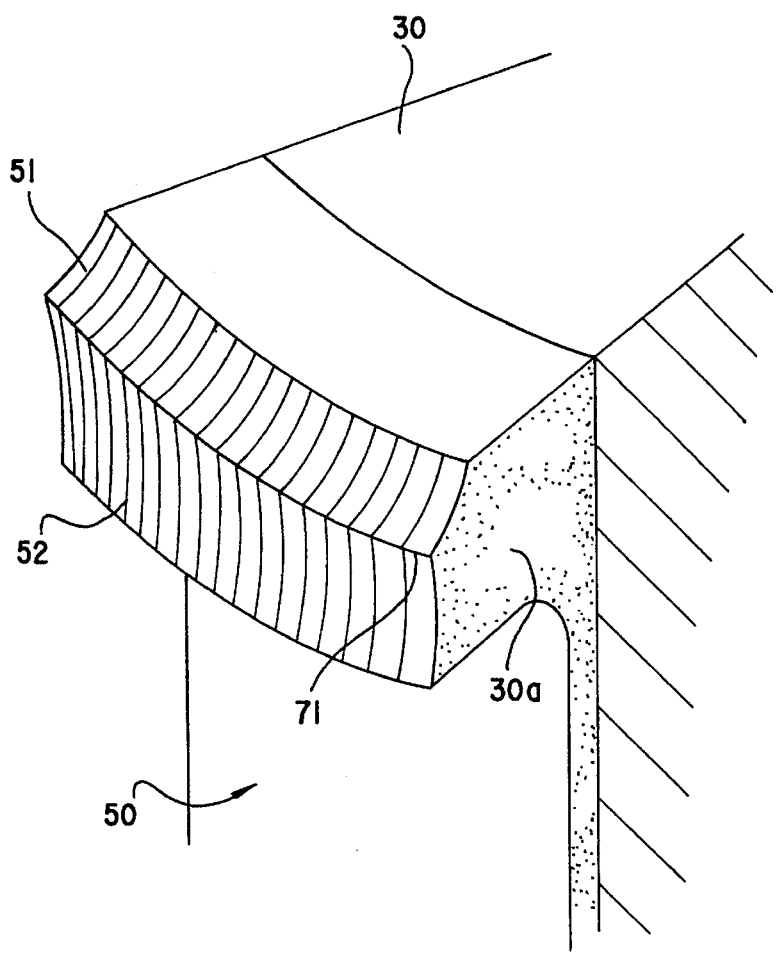
FIG. 7 is an enlarged view of region A in FIG. 6.

The upper rib 30a of trough grinding wheel 30 is illustrated enlarged in FIG. 7, which shows that a honing action is obtained because of the nature of engagement of the two surfaces which is such that the periphery of dressing wheel 60 assumes a toroidal form where all diamond points on the periphery 61 share equally the task of dressing toroidal surfaces 51, 52, 53 and 54 of upper rib 30a.

The mechanism of the dressing operation is more explicitly shown in FIGS. 3 and 8. Here grinding of input-shaft 4 has been completed and is about to be removed to enable the dressing of grinding wheel 30 to be carried out for which purpose slide 38 moves in direction 42 to carry grinding wheel axis 36 to position 36a where it can be brought into contact with dressing wheel 60, which is arranged to be rotated on an axle 63 by motor 64 and drive belt 65.

Axle 63 is carried on arm 66 which extends from housing 67 slideably supported on column 68 and keyed to prevent rotation thereon. Leadscrew 69, driven by servo motor 70 can be used to position the axis of axle 63 to various heights with respect to the axis of input-shaft 4. Similarly grinding wheel 30 may be adjusted in direction 42 by servo motor 41 so its position relative to the axis of dressing wheel 60 can be such as to sequentially occupy the positions shown in FIG. 5 as centres 55, 56, 57 and 58.

The precise accuracy of the form imparted by this dressing operation to grinding wheel 30 is dependent only on the accuracy of the motion imparted by servo motors 41 and 70. The precise radius of dressing wheel 60, which may be reduced progressively by wear, will not significantly affect the accuracy of the form so dressed because of the narrowness of the parts of the toroidal surfaces used and, in any case, precise symmetry is assured. Precise symmetry of the intersection 71 of the toroidal surfaces 51, 52, 53 and 54 is also maintained.

Referring again to FIG. 8, it will be noted that chamfer grinding wheel 21, here shown in clearance position 29 (FIG. 3) can be dressed by diamond cluster 72 supported in cluster dressing tool 73, in turn bracket mounted from housing 32. Servo motor 35 can be used to move the diamond across the surface of chamfer grinding wheel 21 in order to dress the wheel.

Figure 9:
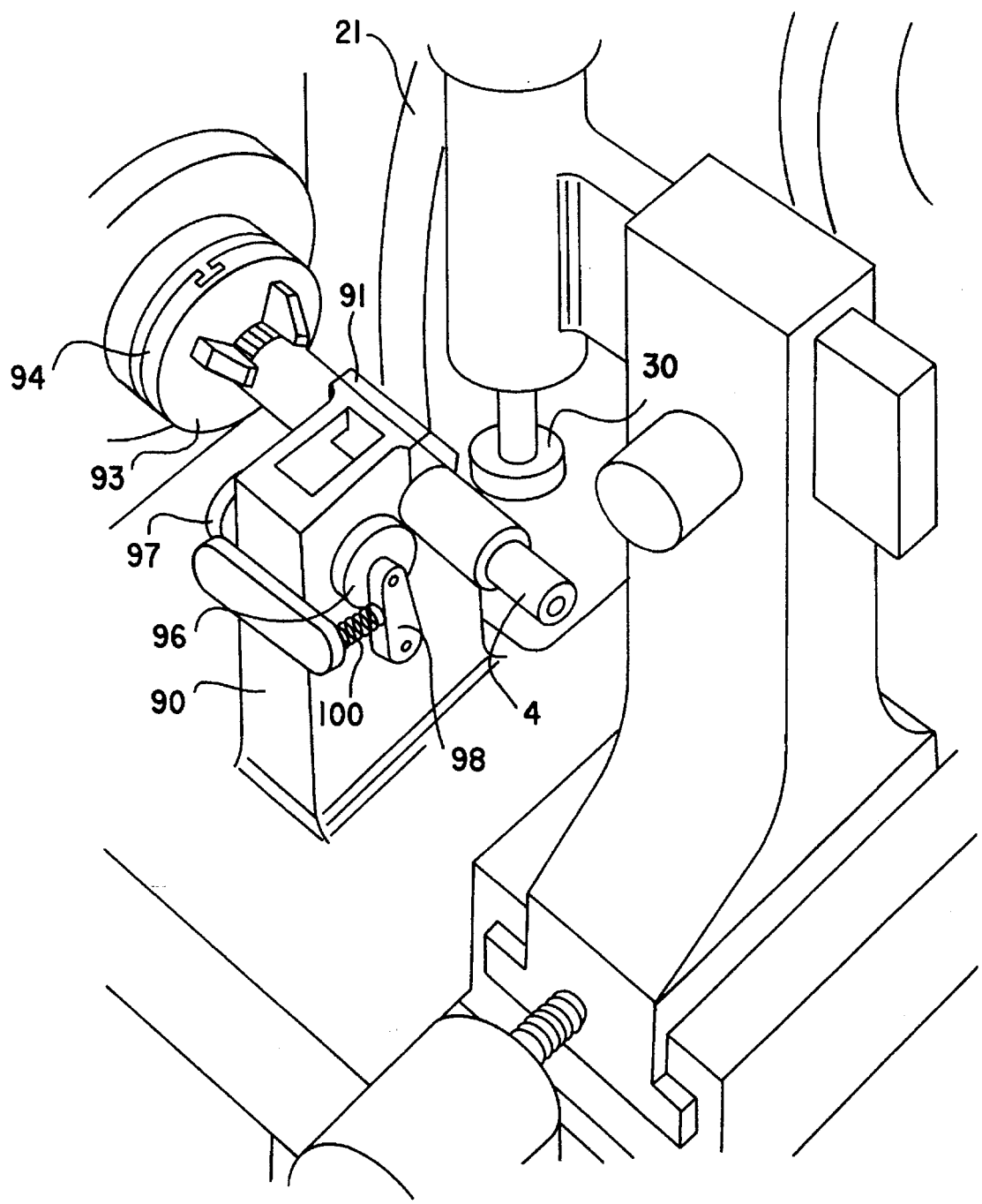
FIG. 9 is a scrap isometric view of a trough grinding machine, in accordance with another embodiment of the present invention, in which the input-shaft is supported in a centreless manner.

Referring now to FIG. 9, another embodiment of the present invention is illustrated in which input-shaft 4 is supported in a centreless manner during grinding of both troughs 5 and chamfers 3 in a single operation.

The use of a centreless support when grinding shallow chamfers on input-shafts is described in International Patent Application PCT/AU91/00495 however centrelessly grinding the troughs without removing the input-shaft from the machine requires the use of a specifically different geometry of the centreless support members which constitutes this further embodiment of the present invention.

A particular feature of the above patent application is that, contrary to the well known practice of centreless grinding, the centreless support members comprise four wear resistance pads, two of which are arranged immediately adjacent on each side of the grinding wheel and the other two located at right angles to the first two and beneath the input-shaft.

By this means the position of the input-shaft in the horizontal plane is determined by the contact between the cylindrical surface of the input-shaft and the pads on each side of the grinding wheel, so that the depth of the contours so ground is independent of the diameter of the input-shaft. Thus, if the widely used practice of selective assembly of the sleeves and input-shaft is used, the width across opposing chamfers is maintained and the boost characteristic of the valve assembly is therefore also precisely controlled.

This arrangement cannot be used in the method described in the present invention because the wear resistant pads must be such as to clear both chamfer grinding wheel 21 and trough grinding wheel 30. The wear resistant pads must therefore be arranged to contact the outside diameter of the input-shaft 4 somewhat away from the horizontal plane passing through the axis of input-shaft 4.

Figure 10:
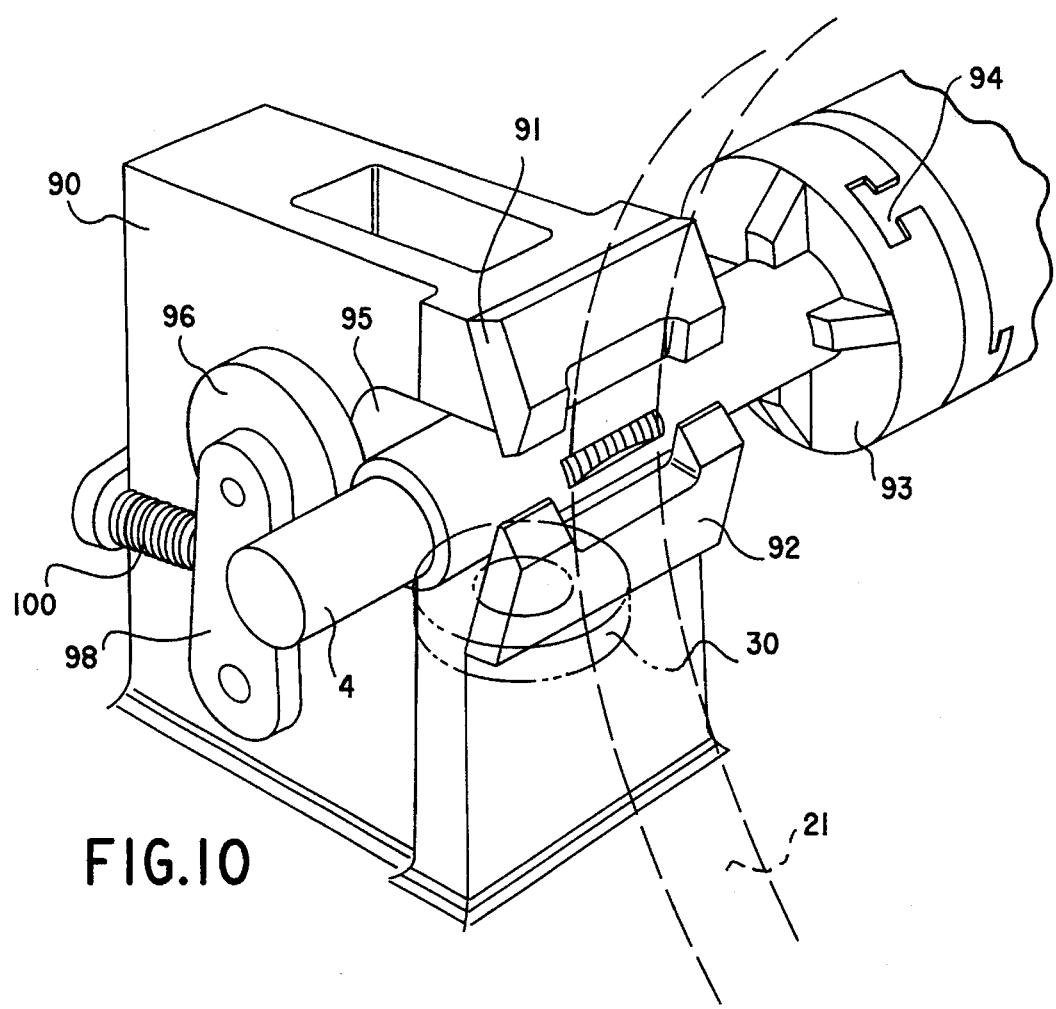
FIG. 10 is a scrap isometric view of the trough grinding machine in FIG. 9, showing details of the centreless support pads and pressure rolls.
Figure 11:
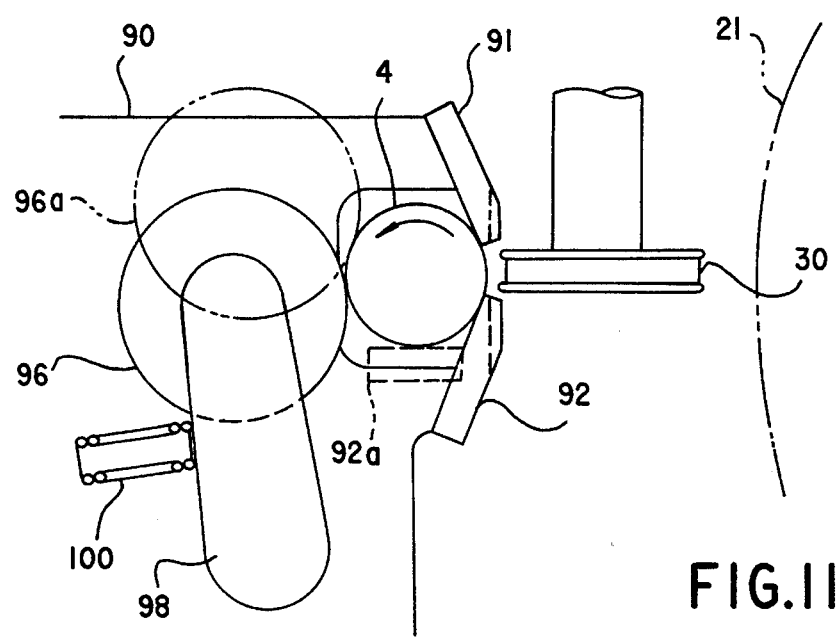
FIG. 11 shows the preferred (and also an alternative) geometry for the centreless support of the input-shaft.

Referring now also to FIGS. 10 and 11, an arrangement is shown in which centres 14 and 15 and tailstock 20 are replaced by support block 90 had wear resistant pads 91 and 92 as a means of precisely supporting input-shaft 4 during grinding. Driving carrier 15 and drive plate 16 are replaced in this arrangement by chuck 93, which floats freely on the spindle of headstock 17 without rotational slack due to the provision of Oldham coupling 94. It is convenient to replace the four wear resistant pads used in the previously referenced co-pending patent application by two wear resistant pads 91 and 92 which are relieved along part of their length to allow clearance for chamfer grinding wheel 21.

Input-shaft 4 is roughly positioned within support block 90 by longitudinal recess 95 therein. Precise contact with pads 91 and 92 is maintained by pressure rolls 96 and 97 journalled on levers 98 and 99 and pressed into contact with input-shaft 4 by springs 100 and 101.

Typically pads 90 and 91 contact input-shaft 4 at positions about 25 degrees above and below the horizontal plane (FIG. 11). Due to frictional forces which operating during rotation of input-shaft 4 in the direction show, it will tend to move downwardly and therefore pressure rolls 96 and 97 will advantageously be set slightly lower than input-shaft 4 as indicated. Because pads 91 and 92 do not contact input-shaft 4 in the horizontal plane but are inclined at about 25 degrees thereto, slight variations of diameter of shaft 4 will result in variations of depth of the chamfers and troughs ground therein to a degree approximating one twentieth of such diametral variation.

In another variation, pad 92 may be replaced by the two pads 92a located directly underneath the input-shaft as taught in the earlier referenced co-pending patent application in order to better support the input-shaft in the event that the shaft extends for a long distance away from the supporting arrangement. In this case pressure rolls 96 and 97 will be advantageously set somewhat higher than the axis of input-shaft 4 as indicated dotted as 96a.

A suitable brand-type for servo controlled drive motor 18 and servomotors 28, 35, 41 and 70 is Siemens 1FT5062. Servomotors 28, 35, 41 and 70 would required inbuilt angular encoders for accurate positioning. A suitable brand-type for motor 24 is Demag KBA112. A suitable brand-type for angular encoder 19 is Heidenhain ROD250. High speed motor 84 could be either electrically or compressed air driven.

It will be recognised by persons skilled in the art that numerous variations and modifications may be made to the invention as described above without departing from the spirit or scope of the invention as hereinafter claimed.

I claim:

1. A machine for grinding longitudinal troughs in the edges of grooves of a power steering valve input-shaft including means to support the input-shaft for rotation about its axis, a grinding spindle having an axis substantially at right angles to the input-shaft axis and laterally displaced therefrom, a grinding wheel mounted on the grinding spindle having a contoured periphery corresponding in cross-section to the cross-section of the trough, means to rotate the spindle, first means to move the grinding wheel relatively towards the input-shaft to some predetermined depth of engagement therewith and to retract the grinding wheel on completion of grinding and a second means to move the grinding wheel axially relative to the input-shaft to form a longitudinal trough therein and means to rotate the input-shaft upon the retraction of the grinding wheel, the grinding wheel being of such a diameter as to produce oblique terminations of the trough.

2. A machine for grinding longitudinal troughs in the edges of grooves of a power steering valve input-shaft as claimed in claim 1 wherein the grinding wheel periphery comprises two contours which are mirror images of each other relative to a line passing through the axis of the input-shaft.

3. A machine for grinding longitudinal troughs in the edges of grooves of a power steering valve input-shaft as claimed in claim 2 wherein each mirror image contour comprises in section at least two intersecting concave arcs of the same radius.

4. A machine for grinding longitudinal troughs in the edges of grooves of a power steering valve input-shaft as claimed in claim 1, including a cylindrical dressing wheel for dressing the grinding wheel, supporting means for the dressing wheel including means for rotating, raising and lowering the axis of the dressing wheel relative to the axis of the grinding wheel, the supporting means being mounted in a position in relation to the grinding wheel such that the grinding wheel is relatively moveable to bring the surface of the grinding wheel into contact with the dressing wheel for dressing.

5. A machine for grinding longitudinal troughs in the edges of grooves of a power steering valve input-shaft as claimed in claim 4 wherein the dressing wheel is substantially cylindrical and whose periphery comprises a cluster of diamonds, the dressing wheel arranged to be rotated on a spindle substantially at right angles to that of the grinding wheel in at least three successive positions.

6. A machine for grinding longitudinal troughs in the edges of grooves of a power steering valve input-shaft as claimed in claim 1 wherein the abrasive surface of the grinding wheel comprises Cubic Boron Nitride (C.B.N.) material 7. A machine for grinding longitudinal troughs in the edges of grooves of a power steering valve input-shaft as claimed in claim 1 including a chamfer grinding wheel mounted adjacent the means to support the input-shaft for rotation, arranged for rotation about an axis substantially parallel to the axis of the input-shaft and means to relatively move the chamfer grinding wheel towards and away from the input-shaft, the chamfer grinding wheel being constructed and arranged to grind a chamfer in the edges of the grooves of the input-shaft preparatory to or after the grinding of said troughs.

8. A machine for grinding longitudinal troughs in the edges of grooves for a power steering input-shaft as claimed in claim 1 wherein means are provided to support said input-shaft between centres during grinding.

9. A machine for grinding longitudinal troughs in the edges of grooves of a power steering valve input-shaft as claimed in claim 1 wherein centreless support members are provided to support said input-shaft during grinding.

10. A machine for grinding longitudinal troughs in the edges of grooves of a power steering valve input-shaft as claimed in claim 9 wherein the centreless support members comprise two sets of wear resistant pads arranged immediately adjacent on each side of the grinding wheel.

11. A method of manufacturing a metering edge contour on the grooves of a power steering valve input-shaft comprising the following steps:

a) milling, hobbing or grinding a plurality of blind-ended, axially extending grooves separated by lands in the outer periphery of an input-shaft of a rotary valve, b) grinding a chamfer on the edge of at least one groove by means of a grinding wheel arranged with its axis substantially parallel to the axis of the input-shaft to produce a surface finish on the chamfer, the lay of which is in the direction of oil flow across the chamfer, and c) grinding a trough in at least one chamfer with a grinding wheel the axis of which is substantially perpendicular to the axis of the input-shaft to produce a surface finish on the trough, the lay of which is substantially perpendicular to the direction of oil flow across the trough.

12. A method of manufacturing a metering edge contour on the grooves of a power steering valve input-shaft comprising the following steps:

a) milling, hobbing or grinding a plurality of blind-ended, axially extending grooves separated by lands in the outer periphery of an input-shaft of a rotary valve, b) grinding a trough in the outer periphery of the input-shaft alongside at least one groove by means of a grinding wheel arranged with its axis substantially perpendicular to the axis of the input shaft to produce a surface finish on the trough, the lay of which is substantially perpendicular to the direction of oil flow across the trough.

c) grinding a chamfer on the edge of at least one groove by means of a grinding wheel arranged with its axis substantially parallel to the axis of the input-shaft to produce a surface finish on the chamfer, the lay of which is in the direction of oil flow across the chamfer.

* * * * *